(12) United States Patent
Gurevich et al.

(10) Patent No.: US 12,737,578 B1
(45) Date of Patent: Sep. 15, 2026

(54) HIGH-RESOLUTION COLOR CAMERA WITH FAST BARCODE READING

(71) Applicant: Zebra Technologies Corporation, Lincolnshire, IL (US)

(72) Inventors: Vladimir Gurevich, Great Neck, NY (US); David P. Goren, Smithtown, NY (US); Matthew Lawrence Horner, Sound Beach, NY (US); Binyamin Stein, Flushing, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 19/261,717

(22) Filed: Jul. 7, 2025

(51) Int. Cl.
*G06K 7/14* (2006.01)
*G06K 7/10* (2006.01)

(52) U.S. Cl.
CPC .......... *G06K 7/1447* (2013.01); *G06K 7/109* (2013.01); *G06K 7/146* (2013.01); *G06K 7/1495* (2013.01)

(58) Field of Classification Search
None
See application file for complete search history.

(56) References Cited

U.S. PATENT DOCUMENTS 8,833,660 B1 * 9/2014 Slutsky .............. G06K 7/10712 235/462.25
2009/0026267 A1 * 1/2009 Wang ................. H04N 1/00334 235/440
2011/0096181 A1 * 4/2011 Carlson .................. H04N 23/84 348/222.1
2013/0129203 A1 * 5/2013 Smith ................ G06K 7/10821 382/162
2023/0059499 A1 * 2/2023 Toizumi .................... G06T 7/11

* cited by examiner

*Primary Examiner* — Kristy A Haupt

(57) ABSTRACT

Imaging devices, systems, and methods for converting a color image to a monochromatic image and decoding using the monochromatic image are described herein. An example device includes: an imaging assembly including one or more processors; a color imaging sensor configured to capture color image data of a field of view (FOV); and a computer-readable medium storing machine readable instructions. The machine readable instructions may, when executed, cause the one or more processors to: (i) capture, using the color imaging sensor, the color image data of the FOV, the color image data corresponding to one or more pixels; (ii) generate, using one or more monochromatic superpixels corresponding to the color image data, a reduced resolution monochromatic image; (iii) analyze the reduced resolution monochromatic image to detect a decode indicia in the reduced resolution monochromatic image; and decode the decode indicia in the reduced resolution monochromatic image.

26 Claims, 7 Drawing Sheets

HIGH-RESOLUTION COLOR CAMERA WITH FAST BARCODE READING

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Barcode reading systems have long been used both to capture and decode barcode data, as well as to perform other image analysis operations. Some such image analysis operations are better or only able to be performed on color images. However, decoding operations are generally better performed on monochrome images. To perform both types of operations, barcode reading systems traditionally integrate multiple imaging sensors (e.g., monochromatic and color imaging sensors) and/or perform color to monochrome conversion techniques. However, traditional systems either must dedicate the space and resources to an additional imaging sensor or introduce additional noise and processing time by analyzing a high-resolution color image that has been converted to monochrome without optimization for decode operations. As such, a system that is able to effectively convert a high-resolution color image to a reduced resolution monochromatic image while maintaining a high signal-to-noise ratio (SNR) is desirable.

SUMMARY

In some aspects, the techniques described herein relate to an imaging device, including: one or more processors; an imaging assembly including a color imaging sensor configured to capture color image data of a field of view (FOV); and a computer-readable medium storing machine readable instructions that, when executed, cause the one or more processors to: capture, using the color imaging sensor, the color image data of the FOV, the color image data corresponding to one or more pixels; generate, using one or more monochromatic superpixels corresponding to the color image data, a reduced resolution monochromatic image, wherein: each monochromatic superpixel of the one or more monochromatic superpixels includes a plurality of pixels of the one or more pixels, and the reduced resolution monochromatic image has a lower resolution than the color image data; analyze the reduced resolution monochromatic image to detect a decode indicia in the reduced resolution monochromatic image; and decode the decode indicia in the reduced resolution monochromatic image.

In some aspects, the techniques described herein relate to an imaging device, wherein the machine readable instructions that, when executed, cause the one or more processors to generate the reduced resolution monochromatic image include further instructions that, when executed, cause the one or more processors to: receive one or more photo-electrons via each of the plurality of pixels of a corresponding monochromatic superpixel; generate, using the one or more photo-electrons, a composite photo-electron count for each respective monochromatic superpixel; and generate the reduced resolution monochromatic image using each composite photo-electron count for the each respective monochromatic superpixel.

In some aspects, the techniques described herein relate to an imaging device, wherein the machine readable instructions that, when executed, cause the one or more processors to generate the composite photo-electron count for each respective monochromatic superpixel include further instructions that, when executed, cause the one or more processors to: average signals associated with the plurality of pixels corresponding to the each respective monochromatic superpixel to generate a composite photo-electron count representative of the averaged signals.

In some aspects, the techniques described herein relate to an imaging device, wherein the machine readable instructions that, when executed, cause the one or more processors to generate the composite photo-electron count for each respective monochromatic superpixel include further instructions that, when executed, cause the one or more processors to: add signals associated with the plurality of pixels corresponding to the each respective monochromatic superpixel to generate a composite photo-electron count representative of the added signals.

In some aspects, the techniques described herein relate to an imaging device, wherein the machine readable instructions that, when executed, cause the one or more processors to receive the one or more photo-electrons include further instructions that, when executed, cause the one or more processors to: receive a first subset of photo-electrons of a first range of photon wavelengths via a first pixel of the plurality of pixels of the corresponding monochromatic superpixel; and receive a second subset of photo-electrons of a second range of photon wavelengths via a second pixel of the plurality of pixels of the corresponding monochromatic superpixel, the second range of photon wavelengths different than the first range of photon wavelengths.

In some aspects, the techniques described herein relate to an imaging device, wherein the machine readable instructions that, when executed, cause the one or more processors to receive the one or more photo-electrons include further instructions that, when executed, cause the one or more processors to: receive a third subset of photo-electrons of a third range of photon wavelengths via a third pixel of the plurality of pixels of the corresponding monochromatic superpixel, the third range of photon wavelengths different than the first range of photon wavelengths and the second range of photon wavelengths.

In some aspects, the techniques described herein relate to an imaging device, wherein the machine readable instructions that, when executed, cause the one or more processors to receive the one or more photo-electrons include further instructions that, when executed, cause the one or more processors to: receive a fourth subset of photo-electrons of the first range of photon wavelengths via a fourth pixel of the plurality of pixels of the corresponding monochromatic superpixel.

In some aspects, the techniques described herein relate to an imaging device, wherein: the first range of photon wavelengths is approximately 495 nanometers to 570 nanometers; the second range of photon wavelengths is approximately 625 nanometers to 750 nanometers; and the third range of photon wavelengths is approximately 400 nanometers to 500 nanometers.

In some aspects, the techniques described herein relate to an imaging device, wherein the color image data includes a Bayer color pattern image.

In some aspects, the techniques described herein relate to an imaging device, wherein the one or more monochromatic superpixels have a first size when the imaging device operates in a first operation mode and a second size when the imaging device operates in a second operation mode.

In some aspects, the techniques described herein relate to an imaging device, wherein the first operation mode is a hand-held scanning mode and the second operation mode is a presentation mode.

In some aspects, the techniques described herein relate to an imaging device, wherein the first size is a 2 pixel by 2 pixel size and the second size is a 4 pixel by 4 pixel size.

In some aspects, the techniques described herein relate to an imaging device, wherein the color imaging sensor is a color rolling shutter sensor.

In some aspects, the techniques described herein relate to an imaging device, wherein the machine readable instructions that, when executed, cause the one or more processors to generate the reduced resolution monochromatic image include further instructions that, when executed, cause the one or more processors to: average signals associated with a subset of the monochromatic superpixels to generate a composite photo-electron count representative of the averaged signals.

In some aspects, the techniques described herein relate to an imaging device, wherein computer-readable medium stores further instructions that, when executed, cause the one or more processors to: transmit, from a first module via a first virtual channel, the reduced resolution monochromatic image for detecting the decode indicia; and transmit, from the first module via a second virtual channel, the color image data.

In some aspects, the techniques described herein relate to a method, implemented in an imaging device including a color imaging sensor, the method including: capturing, via one or more processors and using the color imaging sensor, color image data of a field of view (FOV), the color image data corresponding to one or more pixels; generating, via the one or more processors and using one or more monochromatic superpixels corresponding to the color image data, a reduced resolution monochromatic image, wherein: each monochromatic superpixel of the one or more monochromatic superpixels includes a plurality of pixels of the one or more pixels, and the reduced resolution monochromatic image has a lower resolution than the color image data; analyzing, via the one or more processors, the reduced resolution monochromatic image to detect a decode indicia in the reduced resolution monochromatic image; and decoding, via the one or more processors, the decode indicia in the reduced resolution monochromatic image.

In some aspects, the techniques described herein relate to a method, wherein the generating the reduced resolution monochromatic image includes: receiving, via the one or more processors, one or more photo-electrons via each of the plurality of pixels of a corresponding monochromatic superpixel; generating, via the one or more processors and using the one or more photo-electrons, a composite photo-electron count for each respective monochromatic superpixel; and generating, via the one or more processors, the reduced resolution monochromatic image using each composite photo-electron count for the each respective monochromatic superpixel.

In some aspects, the techniques described herein relate to a method, wherein the generating the composite photo-electron count for each respective monochromatic superpixel includes: averaging, via the one or more processors, signals associated with the plurality of pixels corresponding to the each respective monochromatic superpixel to generate a composite photo-electron count representative of the averaged signals.

In some aspects, the techniques described herein relate to a method, wherein the generating the composite photo-electron count for each respective monochromatic superpixel includes: adding, via the one or more processors, signals associated with the plurality of pixels corresponding to the each respective monochromatic superpixel to generate a composite photo-electron count representative of the added signals.

In some aspects, the techniques described herein relate to a method, wherein the receiving the one or more photo-electrons includes: receiving, via the one or more processors, a first subset of photo-electrons of a first range of photon wavelengths via a first pixel of the plurality of pixels of the corresponding monochromatic superpixel; and receiving, via the one or more processors, a second subset of photo-electrons of a second range of photon wavelengths via a second pixel of the plurality of pixels of the corresponding monochromatic superpixel, the second range of photon wavelengths different than the first range of photon wavelengths.

In some aspects, the techniques described herein relate to a method, wherein the receiving the one or more photo-electrons further includes: receiving, via the one or more processors, a third subset of photo-electrons of a third range of photon wavelengths via a third pixel of the plurality of pixels of the corresponding monochromatic superpixel, the third range of photon wavelengths different than the first range of photon wavelengths and the second range of photon wavelengths.

In some aspects, the techniques described herein relate to a method, wherein the receiving the one or more photo-electrons further includes: receiving, via the one or more processors, a fourth subset of photo-electrons of the first range of photon wavelengths via a fourth pixel of the plurality of pixels of the corresponding monochromatic superpixel.

In some aspects, the techniques described herein relate to a method, wherein: the first range of photon wavelengths is approximately 495 nanometers to 570 nanometers; the second range of photon wavelengths is approximately 625 nanometers to 750 nanometers; and the third range of photon wavelengths is approximately 400 nanometers to 500 nanometers.

In some aspects, the techniques described herein relate to a method, wherein the color image data includes a Bayer color pattern image.

In some aspects, the techniques described herein relate to a method, wherein the one or more monochromatic superpixels have a first size when the imaging device operates in a first operation mode and a second size when the imaging device operates in a second operation mode.

In some aspects, the techniques described herein relate to a method, wherein the first operation mode is a hand-held scanning mode and the second operation mode is a presentation mode.

In some aspects, the techniques described herein relate to a method, wherein the first size is a 2 pixel by 2 pixel size and the second size is a 4 pixel by 4 pixel size.

In some aspects, the techniques described herein relate to a method, wherein the color imaging sensor is a color rolling shutter sensor.

In some aspects, the techniques described herein relate to a method, wherein the generating of the reduced resolution monochromatic image includes: averaging signals associated with a subset of the monochromatic superpixels to generate a composite photo-electron count representative of the averaged signals.

In some aspects, the techniques described herein relate to a method, further including: transmitting, by the one or more processors and from a first module via a first virtual channel, the reduced resolution monochromatic image for detecting the decode indicia; and transmit, by the one or more processors and from the first module via a second virtual channel, the color image data.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1B:
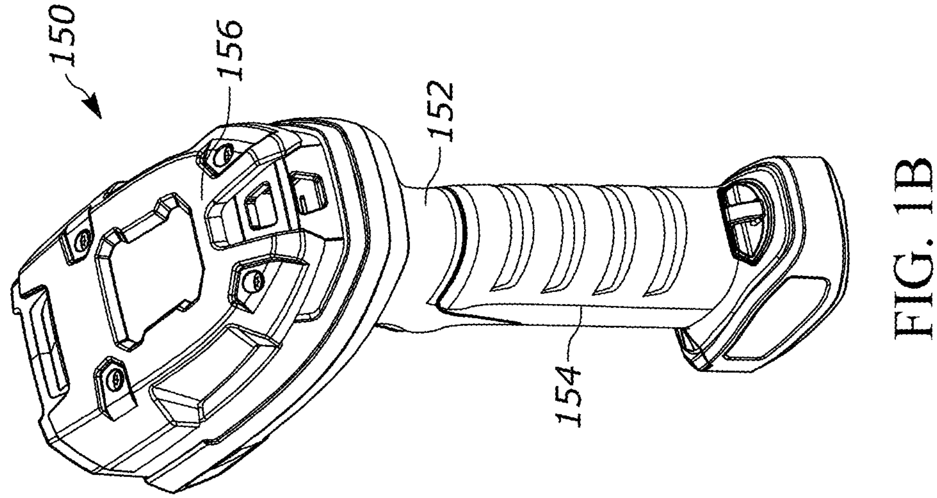
FIG. 1B illustrates a back perspective view of the handheld barcode reader of FIG. 1A.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example imaging devices and/or systems disclosed herein utilize a mono-binning operation via an imaging device including a high-resolution color imaging sensor to convert color images to reduced resolution monochromatic images. As used herein, "decode indicia" refers to one or more features of an image used to perform a decode operation (e.g., a barcode, QR code, payload-encoding watermark, etc.), and therefore encodes a payload. Similarly, as used herein, "reduced resolution monochromatic image" may refer to any monochromatic image that has a reduced resolution compared to a color image of the same field of view (FOV) (e.g., as converted from the color image, such as via mono-binning techniques as described herein). In some implementations, standard techniques for barcode reading using a color image may include utilizing a full-resolution Y-channel (brightness) of a color YUV image (e.g., an image with a luminance/brightness Y and a chrominance of UV). The YUV image may be obtained from a raw image (e.g., a Bayer pattern image) by a series of image processing steps optimized for visual quality of color image. The instant techniques may utilize mono-binning in converting a color image to a reduced resolution monochromatic image for fast decoding, in addition to and/or in place of techniques such as white balance, demosaicing, color balance, Gamma-correction, noise filtering, edge sharpening, and RGB-to-YUV transformation.

Standard techniques for barcode reading via a color image may lead to a low image SNR due to losses of photons in color filters and/or a small pixel area, and longer exposure times being required. Similarly, such techniques may leave a fixed-pattern noise due to different signals of R, G, and B pixels of the Bayer pattern, leading to longer exposure times and hand-jitter affecting decode time and decode ranges. Similarly, different spatial resolution of R, G, and B pixels in the Bayer pattern may cause decode range variation with the color of barcode. Moreover, while color imaging benefits from higher resolution (e.g., 5 MP min, for higher visual quality) images, barcode scanning benefits from lower resolution (e.g., 2 MP max, for higher decode speed) images. Similarly, implementing multiple sensors may require larger devices and more resources. Moreover, monochromatic sensors may have a separate lens with a smaller FOV, which may require a longer distance collection, leading to longer exposure times and greater hand-jitter. As such, it is desirable to reduce the resolution of the color image for fast decode indicia scanning without adding additional sensors for the separate purpose.

In some implementations, an application of mono-binning (e.g., using 2×2 superpixels, 4×4 superpixels, etc.) to a raw Bayer image, when a camera is set for barcode reading, improves image SNR by collecting photons from all color pixels within a super-pixel, which facilitates elimination of fixed-pattern noise on color barcodes. The obtained images can be processed by a decode module and/or device developed for black-and-white images with a reduced resolution range (e.g., 1-2 MP). As such, the instant techniques and devices enable fast barcode reading with minimum effect of hand-jitter by reducing the overall sensor exposure. To further improve motion tolerance, in fixed-mounted presentation application, further increased mono-binning (e.g., with 4×4 superpixels, 8×8 superpixels, etc.) can be used for further reduction of sensor exposure.

In some implementations, to minimize the size of the camera and/or imaging sensor, a 5 MP rolling shutter sensor with a smallest pixel size (e.g., 1.116 μm) is used. In further implementations, for a barcode hand-held scanning mode, 2×2 mono-binned 1.2 MP images are used, and, in a short-range presentation mode, 4×4 mono-binned 0.3 MP images are used over short decode ranges with high speed swipe decoding. In some such implementations, after performing a mono-binning operation (e.g., the 2×2 mono-binning operation, the 4×4 mono-binning operation, etc.), an imaging device controller may perform image scaling (e.g., integer image scaling, non-integer image scaling (e.g., 1.2× scaling, 1.25× scaling, 1.5× scaling, etc.) to achieve an improved balance between image resolution and SNR.

In still further implementations, for a short-range presentation mode, an imaging device controller may average multiple superpixels (e.g., 2×2 superpixels, 4×4 superpixels, etc.) with a predetermined number of superpixel steps (e.g., determining one set of superpixels prior to averaging, two sets of superpixels, three sets of superpixels, etc.) to improve the image SNR without further reduction of the image resolution.

Figure 1A:
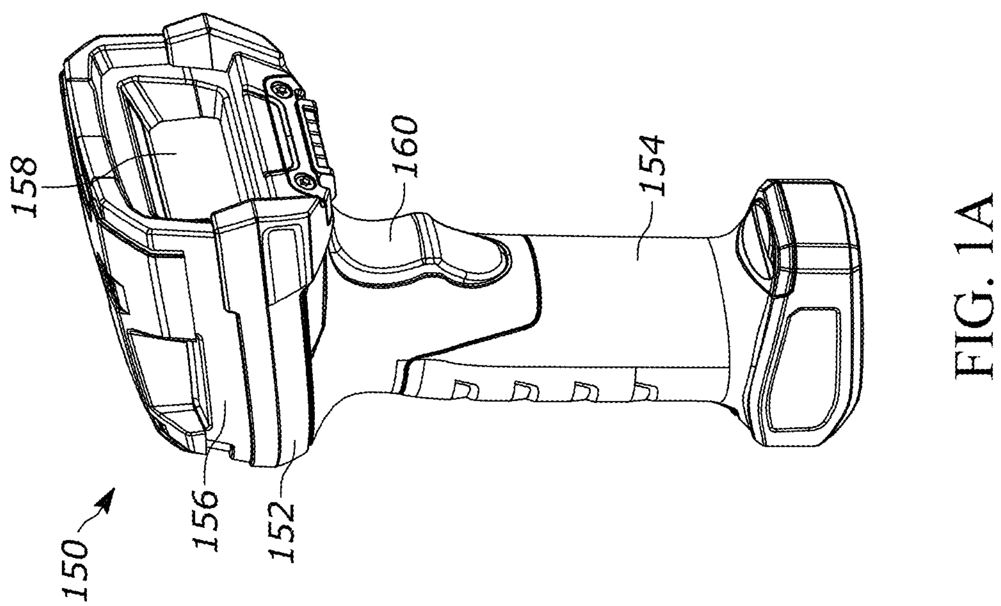
FIG. 1A illustrates a front perspective view of an example handheld barcode reader.

Referring first to FIGS. 1A and 1B, illustrated therein is an exemplary imaging device. In particular, handheld imaging device 150 has a housing 152 with a handle portion 154, also referred to as a handle 154, and a head portion 156, also referred to as a scanning head 156. The head portion 156 includes a window 158 and is configured to be positioned on the top of the handle portion 154. The handle portion 154 is configured to be gripped by a reader user and includes a trigger 160 for activation by the user. Optionally included in an embodiment is also a base (not shown), also referred to as a base portion, which may be attached to the handle portion 154 opposite the head portion 156, and is configured to stand on a surface and support the housing 152 in a generally upright position. The handheld imaging device 150 can be used in a hands-free mode as a stationary workstation when it is placed on a countertop or other workstation surface. The handheld imaging device 150 can also be used in a handheld mode when it is picked up off the countertop or base station and held in an operator's hand. In the hands-free mode, products can be slid, swiped past, or presented to the window 158 for the reader to initiate barcode reading operations. In the handheld mode, the handheld imaging device 150 can be moved towards a barcode on a product, and the trigger 160 can be manually depressed to initiate imaging of the barcode.

Other implementations may provide only handheld or only hands-free configurations. In the embodiment of FIGS. 1A and 1B, the handheld imaging device 150 is ergonomically configured for a user's hand, though other configurations may be utilized as understood by those of ordinary skill in the art. As shown, the handle 154 extends below and rearwardly away from the housing 152 along a centroidal axis obliquely angled relative to a central FOV axis of a FOV of an imaging assembly within the scanning head 156.

Figure 2:
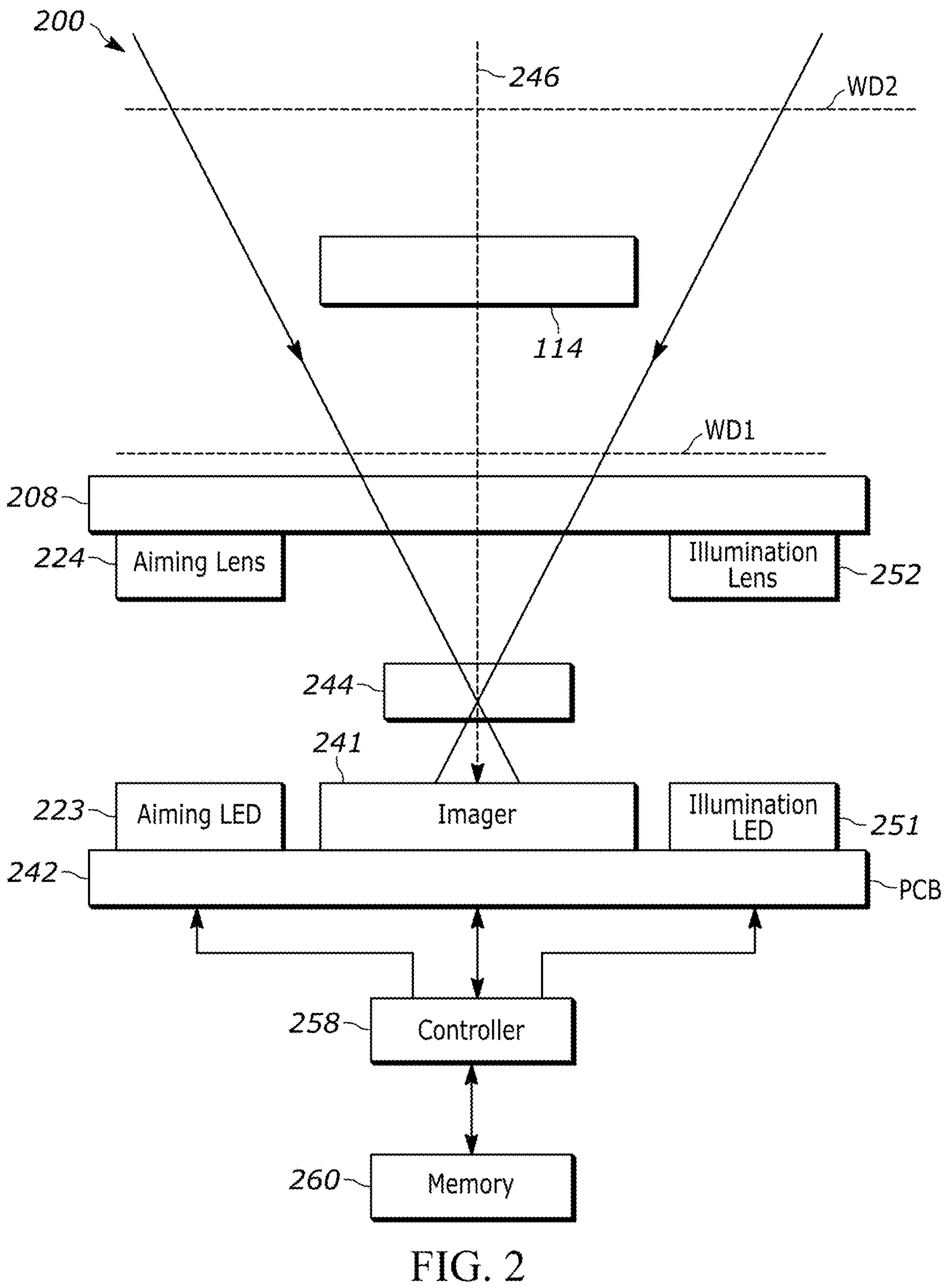
FIG. 2 illustrates a block diagram of an example imaging device such as the example barcode readers of FIGS. 1A-1B.

In some embodiments, an imaging assembly includes a light-detecting sensor or imager operatively coupled to, or mounted on, a printed circuit board (PCB) in the handheld imaging device 150 as shown in FIG. 2. In further embodiments, an illuminating light assembly is also mounted in the handheld imaging device 150. The illuminating light assembly may include an illumination light source and at least one illumination lens, configured to generate a substantially uniform distributed illumination pattern of illumination light on and along an object to be read by image capture, as described below with regard to FIG. 2.

Referring next to FIG. 2, a block diagram of an example architecture for an imaging device such as the handheld imaging device 150 is shown. For at least some of the reader implementations, an imaging assembly of the imaging device 200 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imager 241 over a field of view along an imaging axis 246 through the window 208. The imager 241 may also include and/or function as a color sensor. It should be understood that the terms "imager", "image sensor", and "imaging sensor" are used interchangeably herein. Depending on the implementation, imager 241 may include a color sensor such as a vision camera. In some implementations, the imager 241 is or includes a barcode reading module (e.g., a monochromatic imaging sensor). In further implementations, the imager 241 additionally or alternatively is or includes a vision camera (e.g., a color imaging sensor). It will be understood that, although imager 241 is depicted in FIG. 2 as a single block, that imager 241 may be multiple sensors spread out in different locations of imaging device 200.

The return light is scattered and/or reflected from an object 114 over the field of view. The imaging lens 244 is operative for focusing the return light onto the array of image sensors to enable the object 114 to be imaged. In particular, the light that impinges on the pixels is sensed and the output of those pixels produce image data that is associated with the environment that appears within the FOV (which can include the object 114). This image data is typically processed by a controller (usually by being sent to a decoder) which identifies and decodes decodable indicia captured in the image data. Once the decode is performed successfully, the reader can signal a successful "read" of the object 114 (e.g., a barcode). The object 114 may be located anywhere in a working range of distances between a close-in working distance (WD1) and a far-out working distance (WD2). In an implementation, WD1 is about one-half inch from the window 208, and WD2 is about thirty inches from the window 208.

An illuminating light assembly may also be mounted in, attached to, or associated with the imaging device 200. The illuminating light assembly includes an illumination light source 251, such as at least one light emitting diode (LED) and at least one illumination lens 252, and preferably a plurality of illumination and illumination lenses, configured to generate a substantially uniform distributed illumination pattern of illumination light on and along the object 114 to be imaged by image capture. Although FIG. 2 illustrates a single illumination light source 251, it will be understood that the illumination light source 251 may include more light sources. At least part of the scattered and/or reflected return light is derived from the illumination pattern of light on and along the object 114.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 114 in the direction of the FOV of the imager 241. It will be understood that, although the aiming light assembly and the illumination light assembly both provide light, an aiming light assembly differs from the illumination light assembly at least in the type of light the component provides. For example, the illumination light assembly provides diffuse light to sufficiently illuminate an object 114 and/or an indicia of the object 114 (e.g., for image capture). An aiming light assembly instead provides a defined illumination pattern (e.g., to assist a user in visualizing some portion of the FOV). Similarly, in some implementations, the illumination light source 251 and the aiming light source 223 are active at different, non-overlapping times. For example, the illumination light source 251 may be active on frames when image data is being captured and the aiming light source 223 may be active on frames when image data is not being captured (e.g., to avoid interference with the content of the image data).

In further implementations, the imaging device 200 may additionally emit an auditory cue, such as a chime, beep, message, etc. In still further implementations, the imaging device 200 may provide haptic feedback to a user, such as vibration (e.g., a single vibration, vibrating in a predetermined pattern, vibrating synchronized with flashing, etc.).

Further, the imager 241, the illumination source 251, and the aiming source 223 are operatively connected to a controller or programmed controller 258 (e.g., a microprocessor facilitating operations of the other components of imaging device 200) operative for controlling the operation of these components. In some implementations, the controller 258 functions as or is communicatively coupled to a vision application processor for receiving, processing, and/or analyzing the image data captured by the imager 241.

A memory 260 is connected and accessible to the controller 258. Preferably, the controller 258 is the same as the one used for processing the captured return light from the illuminated object 114 to obtain data related to the object 114. Though not shown, additional optical elements, such as collimators, lenses, apertures, compartment walls, etc. may be provided in the housing. Although FIG. 2 shows the imager 241, the illumination source 251, and the aiming source 223 as being mounted on the same PCB 242, it should be understood that different implementations of the imaging device 200 may have these components each on a separate PCB, or in different combinations on separate PCBs. For example, in an implementation of the imaging device 200, the illumination LED source is provided as an off-axis illumination (i.e., has a central illumination axis that is not co-axial with the central FOV axis).

Figure 3A:
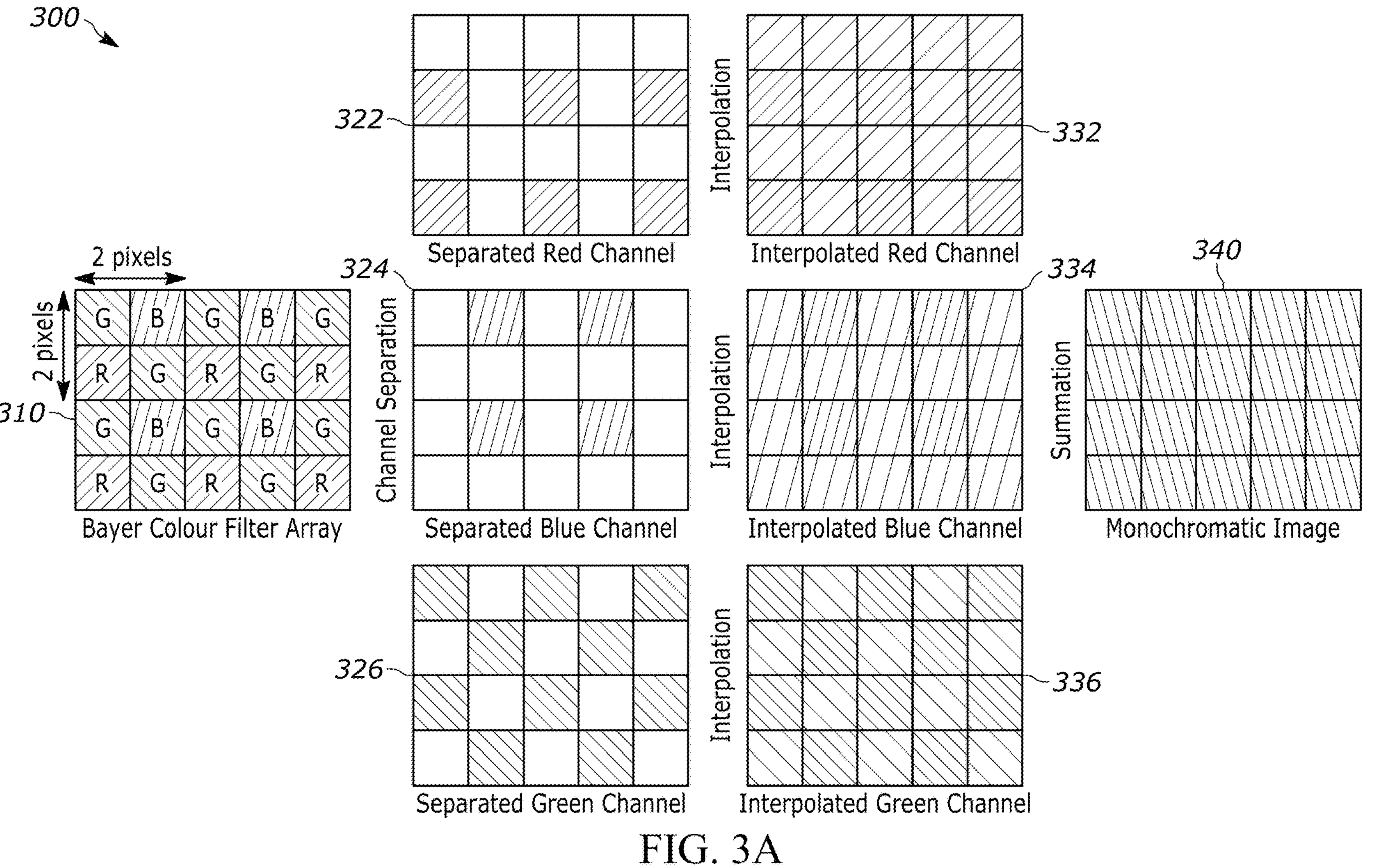
FIG. 3A illustrates a standard technique for converting a color image to a monochromatic image using pixel color filtering and interpolation.

FIG. 3A depicts a color analysis process 300 for processing color images and converting the color image to a monochromatic image for decoding purposes. In some implementations, the color analysis process 300 may include a demosaicing process, and the color image 310 may be or include a Bayer pattern. In particular, an imaging device performing the color analysis process 300 may separate the pixel array of the color image 310 into specific color planes associated with the individual color pixels. For example, the imaging device may separate the pixel array of the color image into a separated red channel 322, a separated blue channel 324, and a separated green channel 326. The imaging device may then interpolate the missing values for each plane (e.g., using a demosaicing algorithm, a bilinear demosaicing algorithm, a bilinear nearest neighbor demosaicing algorithm, etc.). The imaging device may therefore generate an interpolated red channel 332, an interpolated blue channel 334, an interpolated green channel 336, and/or any other such channel. The imaging device may then determine a weighted average of the RGB values for each pixel to determine a corresponding brightness value and use the brightness value(s) to build a monochrome image 340 that can be fed into a decoder.

Figure 3B:
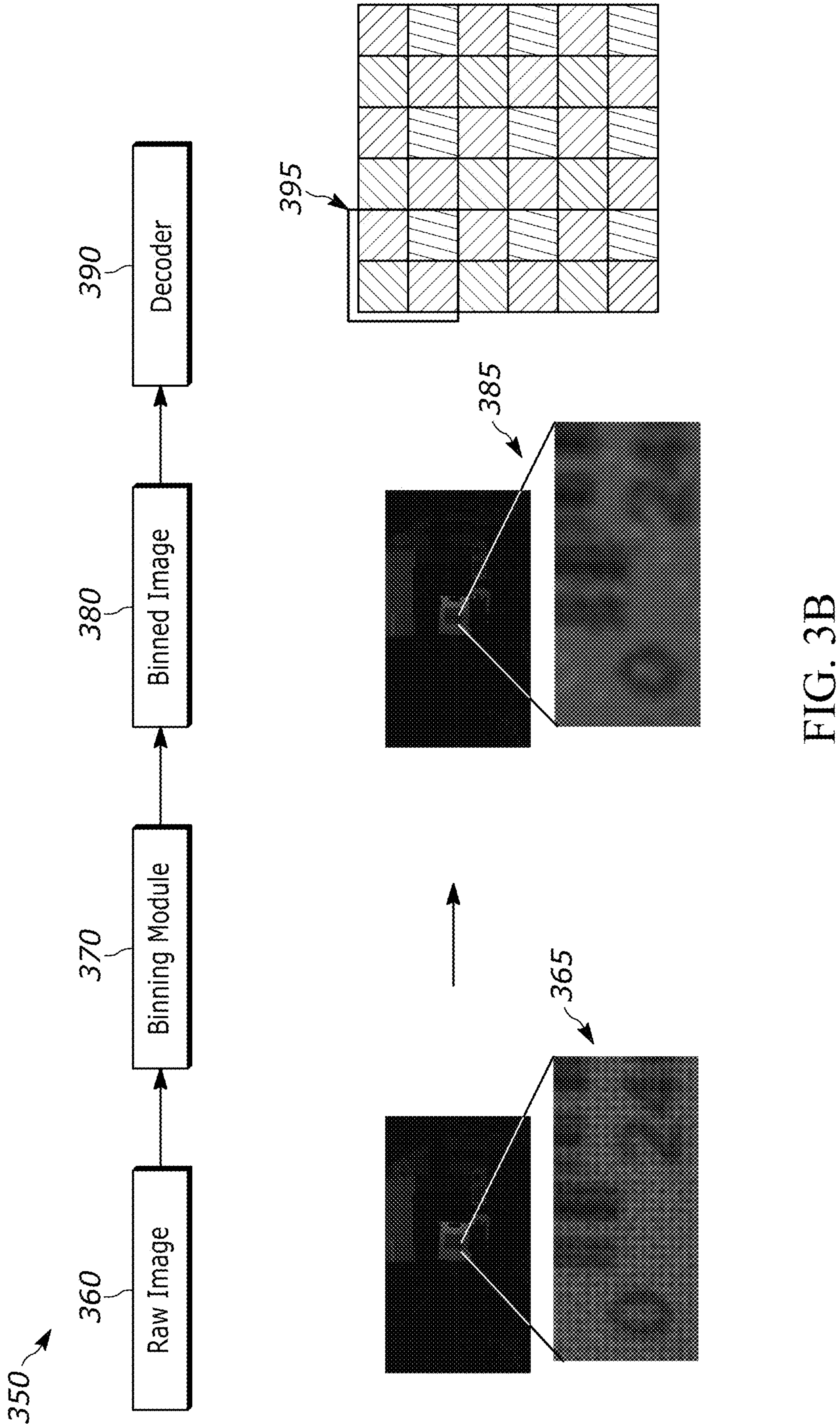
FIG. 3B illustrates a technique for using mono-binning operation(s) to convert a color image to a monochromatic image.

FIG. 3B depicts a mono-binning color analysis process 350 for processing color images using mono-binning techniques to generate a reduced resolution monochromatic image. In particular, an imaging device (e.g., handheld imaging device 150) may capture a raw image 360 using a color imaging sensor. As such, the raw image 360 may include color data, and may be or include a Bayer pattern image as described with regard to color image 310 above. In some implementations, the raw image 360 may be of a black and white decode indicia, a black and red decode indicia, a black and red with blue pixels decode indicia, etc. When captured with a color sensor of appropriately high-resolution for color imaging and analysis using techniques such as those described with regard to FIG. 3A, the raw image 360 may include a noise pattern 365 (e.g., due to the different signals of the red (R), green (G), and blue (B) pixels forming the raw image 360. As such, the overall signal-to-noise ratio (SNR) for the raw image 360 may be low due to the losses of photon and/or corresponding photo-electrons in color filters and/or the small pixel area. Such noisy images may cause delays and/or additional processing required for a decode operation to be performed.

As such, the mono-binning color analysis process 350 introduces a mono-binning procedure on the raw image 360 to convert the raw image 360 from a color image to a monochrome image while reducing the noise pattern 365 and improving the overall SNR for analysis by a decoder 390. Further, the decoder 390 performs a decoding process that receives minimal benefit from an increased resolution, and instead requires additional time to parse the increased resolution images. As such, the decoder 390 and the decoding process are improved by performing the mono-binning process which, as described below in more depth, inherently reduces the resolution of the raw image 360.

In particular, a binning module 370 of the imaging device may receive the raw image 360, captured by a color image sensor configured to receive different wavelengths of light at a plurality of different color pixels (e.g., as described above with regard to the color image 310 of FIG. 3A). The binning module 370 may then define and/or utilize superpixels 395 of pixels to perform a mono-binning process. In particular, the binning module 370 may define or receive an indication of a group of pixels to make up a larger superpixel 395. Depending on the implementation, the superpixel 395 may be a 2×2 pixel superpixel, 4×4 pixel superpixel, 8×8 pixel superpixel, and/or any other such sized superpixel. In some implementations, the superpixel 395 may have an equal height to length pixel count (e.g., 2 pixels by 2 pixels) or different height to length pixel counts (e.g., 2 pixels by 4 pixels). In further implementations, the superpixel 395 height and/or length pixel count(s) may be specifically designed and/or defined to be a multiple of 2 (e.g., 2 pixels, 4 pixels, 6 pixels, etc.), equivalent to $2^x$, (e.g., 2, 4, 8, etc.), or any pixel group size (e.g., 2×2, 3×3, 4×4, etc.).

The binning module 370 may receive one or more photo-electrons via each superpixel indicative of photons striking the elements of the color imaging sensor corresponding to the various pixels of the superpixel. By way of example, the superpixel 395 may include four pixels (e.g., a red pixel, a blue pixel, and two green pixels). For color imaging and analysis, the photo-electrons transmitted responsive to the photons striking the corresponding elements are representative of the corresponding colors, and the color image is generated accordingly (e.g., as described with regard to FIG. 3A, above). However, for the mono-binning process, the photo-electron counts for the individual pixels within the superpixel 395 are combined to determine a composite photo-electron count representative of the intensity of a corresponding portion of the generated reduced resolution monochromatic image. Depending on the implementation, the photo-electron count for the pixels may be added, averaged, etc. to generate a superpixel photo-electron count. The superpixel photo-electron count may similarly be averaged, added, and/or otherwise combined to determine larger portions (e.g., a subset, overall, etc.) photo-electron count from the image sensor. The binning module 370 therefore generates a binned image 380, which is subsequently input into the decoder for a decoding process. In further implementations, the binned image 380 may be input into other modules to perform other functionalities associated with monochromatic images.

As such, by utilizing the respective superpixels rather than the individual color-filtered pixels via a mono-binning process, the binning module 370 converts a color image is to monochrome (e.g., for decoding purposes). Similarly, because the composite photo-electron counts are combined, the noise pattern is smoothed and the resolution is lowered, generating a low-resolution binned image 380 with a smoothed pattern 385.

Figure 4A:
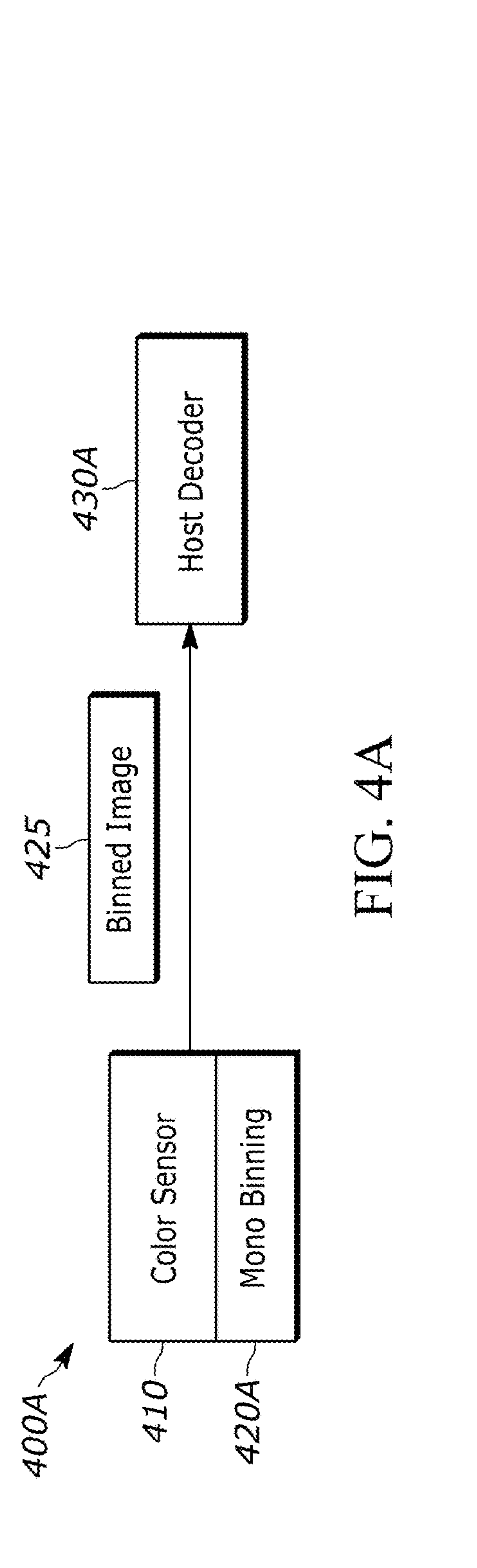
FIG. 4A illustrates a block diagram of an example architecture for a system implementing the techniques of FIG. 3B.
Figure 4B:
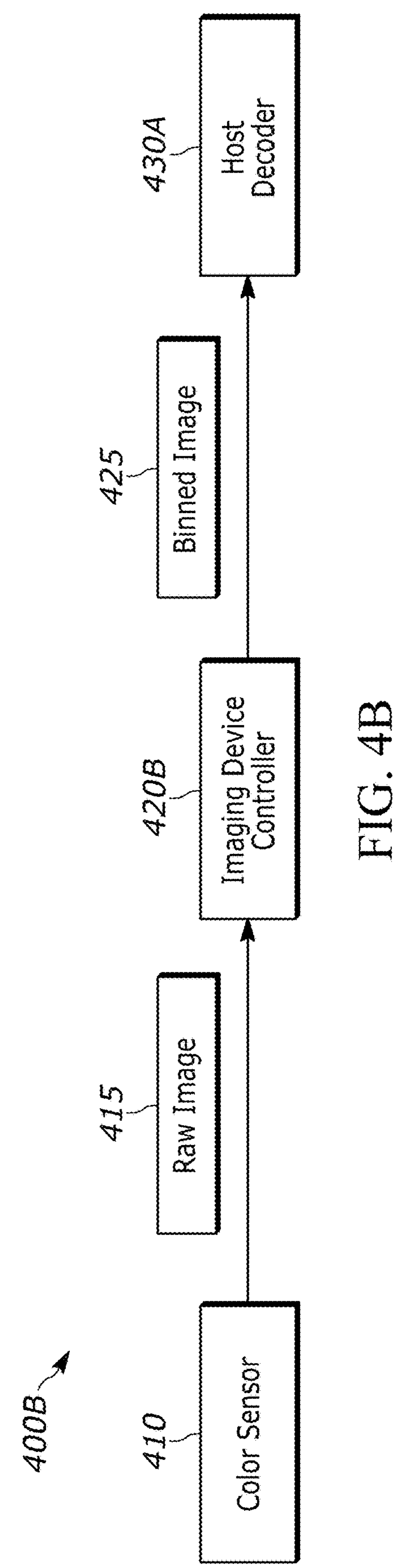
FIG. 4B illustrates a block diagram similar to that of FIG. 4A, but in which the mono-binning module is implemented on a separate imaging device controller rather than the color sensor.
Figure 4C:
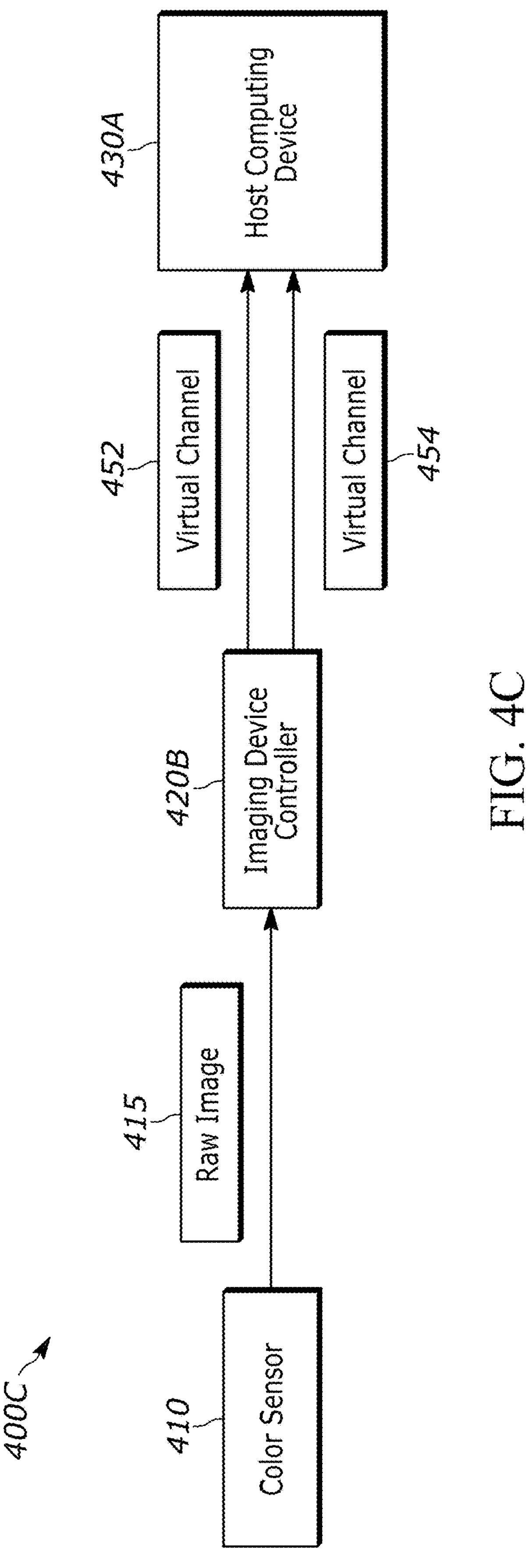
FIG. 4C illustrates a block diagram similar to that of FIGS. 4A and 4B, but in which the imaging device controller transmits color image data and binned image data to a host computing device on separate channels.

FIG. 4A-4C is a block diagram of an example architectures of systems 400A, 400B, and 400C (collectively referred to as "systems 400") that may be configured to implement the methods as described herein (e.g., method 500 of FIG. 5), and generate a reduced resolution monochromatic image from a color image. Depending on the implementation, the systems 400 may include a color sensor 410 and a host decoder 430A. In further implementations, the systems 400 may include additional components and/or channels for performing mono-binning operations as described herein (e.g., with regard to FIG. 3B above).

Depending on the implementation, the system 400 may be implemented in a single imaging device (e.g., handheld imaging device 150 of FIGS. 1A and 1B). In further implementations, the system 400 may include multiple devices (e.g., an imaging device, a computing device, a controller device, etc.) communicatively coupled and configured to perform the techniques as described herein. As such, it will be understood that the system 400 may include additional, fewer, and/or alternate components.

Turning first to FIG. 4A, the system 400A may include the color sensor 410 and the host decoder 430A. Depending on the implementation, the color sensor 410 may be a specifically designed color sensor 410 with mono-binning capability. In such implementations, the color sensor 410 may include a mono-binning module 420A, and the system 400A may perform the mono-binning operations (e.g., as described above with regard to FIG. 3B) via the mono-binning module 420A. As such, the color sensor 410 is able to perform the mono-binning operation without transmitting the raw image to another component and/or device of the system 400A. After generating the binned image 425, the color sensor 410 then transmits the binned image 425 directly to the host decoder 430A.

Turning next to FIG. 4B, the system 400B includes the color sensor 410 and the host decoder 430A, as well as an imaging device controller 420B facilitating analysis and/or communication between the color sensor 410 and the host decoder 430A. Depending on the implementation, the imaging device controller 420B may be or include an application-specific integrated circuit (ASIC) controller, an in-system programming (ISP) or in-circuit serial programming (ICSP) controller, and/or any other such microcontroller. In such implementations, the color sensor 410 transmits the raw image 415 to the imaging device controller 420B, which generates the binned image 425 using the mono-binning techniques as described above. The imaging device controller 420B then transmits the binned image 425 to the host decoder 430A for performing the decode operation.

Turning next to FIG. 4C, the system 400C includes the color sensor 410 and imaging device controller 420B of FIG. 4B. Rather than transmit the binned image 425 to the host decoder 430A directly, however, the imaging device controller 420B transmits data to a host computing device 430C over virtual channels 452, 454. In some implementations, the host computing device 430C performs multiple operations using the raw image 415 and/or image data associated with the raw image 415. In some implementations, for example, the host computing device 430C performs color imaging and/or color imaging analysis (e.g., object recognition operations, machine vision operations, facial detection operations, etc.) on the color image and/or color image data, and decoding on the mono-binned image data. In some such implementations, the imaging device controller 420B transmits the mono-binned image data and the color image data on separately channels and/or separately. For example, the imaging device controller 420B may transmit the mono-binned image data via a first virtual channel 452 and the color image data via a second virtual channel 454. Depending on the implementation, the virtual channels 452, 454 may be or include mobile industry processor interface (MIPI) virtual channels. Similarly, the virtual channels 452, 454 may be configured to transmit particular image data (e.g., mono-binned image data, RGB color data, YUV color data, etc.).

Figure 5:
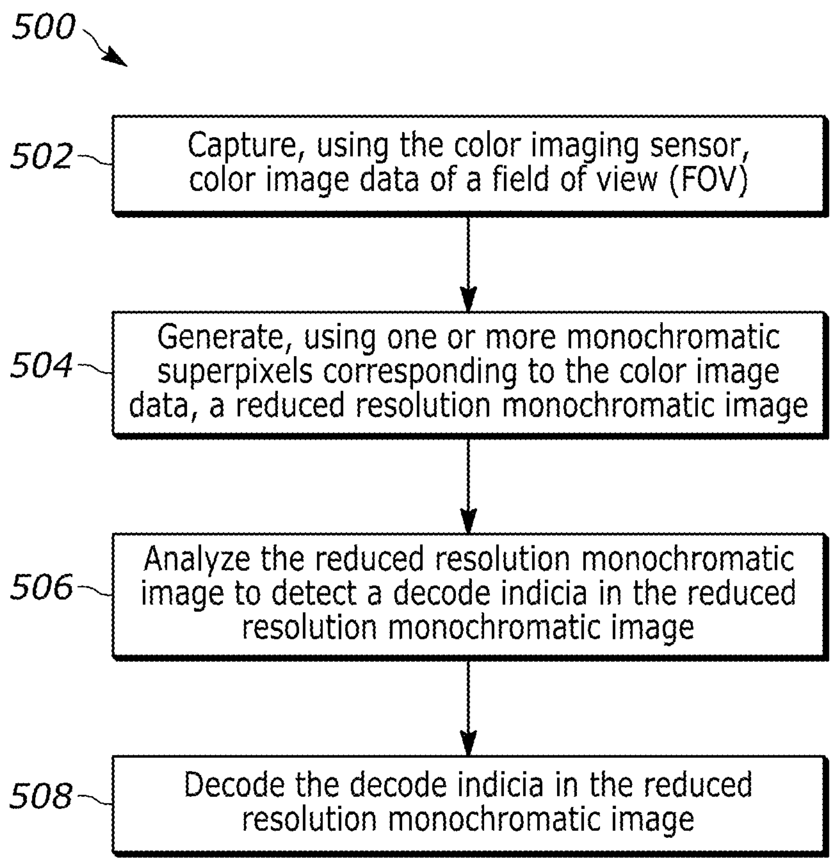
FIG. 5 illustrates a flow diagram of an example method for converting a color image to a reduced resolution monochromatic image and decoding the monochromatic image, implemented in an imaging device, such as the example handheld barcode reader of FIGS. 1A-1B or the example imaging device of FIG. 2.

Referring next to FIG. 5, the method 500 illustrates a flow diagram of an example method for capturing color image data and generating a reduced resolution monochromatic image for decode purposes. Although the method 500 is described below with regard to imaging device 200 and components thereof as illustrated in FIG. 2, it will be understood that other similarly suitable systems (e.g., including imaging and/or computing devices) and/or components thereof may be used instead (e.g., handheld imaging device 150, a bioptic barcode reader, an imaging engine of a machine vision system, etc.).

At block 502, the imaging device 200 captures color image data of a field of view (FOV). In some implementations, the imaging device 200 captures the color image data using a color imaging sensor. In further implementations, the color image data corresponds to (e.g., includes, is associated with, is generated from, etc.) one or more pixels. In some implementations, the color image data may be or include a Bayer color pattern image (e.g., half green, one quarter red, and one quarter blue), as described in more detail with regard to FIGS. 3A and 3B.

At block 504, the imaging device 200 generates a reduced resolution monochromatic image. In some implementations, the imaging device 200 generates the reduced resolution monochromatic image using one or more monochromatic superpixels corresponding to the color image data (e.g., as captured at block 502). In further implementations, each monochromatic superpixel comprises a plurality of pixels corresponding to the color image data. Depending on the implementation, the reduced resolution monochromatic image has a lower resolution than the color image data.

In further implementations, the imaging device 200 may generate the reduced resolution monochromatic image by using various mono-binning techniques as described herein. Depending on the implementation, by performing mono-binning techniques on color images the imaging device 200 improves the signal-to-noise ratio (SNR) of the reduced resolution image (e.g., by eliminating the losses of photons in color filters and small pixel area from standard color processing techniques). In further implementations, performing mono-binning techniques as described herein (e.g., using monochromatic super pixels) may eliminate fixed-pattern noise due to different signals of red, green, and blue pixels of a Bayer pattern (i.e., further reducing exposure times and hand-jitter, improving the decode time and ranges). Moreover, by eliminating the fixed-pattern noise and standardizing the spatial resolution of RGB pixels in the Bayer pattern, decode range variation due to a color of the decode indicia is reduced.

In some implementations, as part of generating the reduced resolution monochromatic image, the imaging device 200 receives one or more photo-electrons via each of the plurality of pixels for a corresponding monochromatic superpixel. The imaging device 200 may then, using the photo-electron(s), generate a composite photo-electron count for the monochromatic superpixel. Depending on the implementation, the imaging device 200 may then generate the reduced resolution monochromatic image using the composite photo-electron count for each respective monochromatic superpixel. Depending on the implementation, the imaging device 200 may generate the reduced resolution monochromatic image using the composite photo-electron count by implementing averaging techniques, summation techniques, and/or any other such techniques as described herein (e.g., to modify saturation of color pixels, dark levels, etc.). For example, the imaging device 200 may average signals associated with the pixel(s) corresponding to a respective monochromatic superpixel to generate the composite photo-electron count representative of the averaged signals. In further implementations, the imaging device 200 may add the signals instead. Depending on the implementation, the imaging device 200 may sum or average the photo-electron count based on an operation mode (e.g., hand-held mode, presentation mode, etc.), a superpixel size (e.g., 2×2 superpixels, 4×4 superpixels, etc.). In further implementations, the imaging device 200 may average the counts from the superpixels overall rather than from individual pixels.

In still further implementations (e.g., for a short-range presentation mode), the imaging device 200 may average multiple superpixels (e.g., 2×2 superpixels, 4×4 superpixels, etc.) with a predetermined number of superpixel steps (e.g., determining one set of superpixels prior to averaging, two sets of superpixels, three sets of superpixels, etc.) to improve the image SNR without further reduction of the image resolution.

In further implementations, the photo-electrons include subsets of photo-electrons based on the particular pixel(s). For example, in receiving the photo-electrons, the imaging device 200 may receive a first subset of photo-electrons in a first range of photon wavelengths via a first pixel of the corresponding monochromatic superpixel. Similarly, the system may receive a second subset of photo-electrons in a second range of wavelengths via a second pixel and/or a third subset of photo-electrons in a third range of wavelengths via a third pixel. In further implementations, the system may receive a fourth subset of photo-electrons in the first wave of wavelengths via a fourth pixel (e.g., matching the first pixel). Depending on the implementation, the first pixel, second pixel, and third pixel may receive photo-electrons within a range of wavelengths representative of red light (e.g., light with a wavelength of 625-750 nm), blue light (e.g., light with a wavelength of 400-500 nm), green light (e.g., light with a wavelength of 495-570 nm), etc. Depending on the implementation, the fourth pixel may similarly receive photo-electrons within any of the above range of wavelengths and may match any one of the first pixel, second pixel, and/or third pixel. In still further implementations, the fourth pixel may receive all photo-electrons and/or photo-electrons in another range of wavelengths.

At block 506, the imaging device 200 analyzes the reduced resolution monochromatic image to detect a decode indicia in the reduced resolution monochromatic image. Depending on the implementation, the reduced resolution monochromatic image may be a different resolution and/or have differently sized superpixels based on an operation mode of the imaging device. In some such implementations, an imaging device may operate in a hand-held scanning mode and a presentation mode, and the superpixels may have a first size in the hand-held scanning mode and a second size in the presentation mode. For example, the superpixels may be 2×2 superpixels (e.g., with a 0.8 MP resolution, 1.2 MP resolution, 1.6 MP resolution, etc.) when operating in the hand-held scanning mode, and may be 4×4 superpixels (e.g., with a 0.2 MP resolution, 0.3 MP resolution, 0.4 MP resolution, etc.) while operating in a presentation mode. In some such implementations, the hand-held scanning mode may operate at a higher resolution to reduce jitter (e.g., hand-jitter), and the presentation mode may operate at a lower resolution to improve exposure.

In further implementations, the superpixels may remain the same between operation modes (e.g., 2×2 superpixels, 4×4 superpixels, 8×8 superpixels, etc.). In still further implementations, the reduced resolution monochromatic image may utilize different resolutions and/or superpixel sizes based on a zoom level of the imaging device. For example, the imaging device may use 2×2 superpixels (e.g., with a 1.2 MP resolution) and may zoom 2× to use 4×4 superpixels (e.g., with a 0.3 MP resolution).

In some such implementations, after performing a mono-binning operation (e.g., the 2×2 mono-binning operation, the 4×4 mono-binning operation, etc.), an imaging device 200 may perform image scaling (e.g., integer image scaling, non-integer image scaling (e.g., 1.2× scaling, 1.25× scaling, 1.5× scaling, etc.) to achieve an improved balance between image resolution and SNR.

At block 508, the imaging device 200 decodes the decode indicia in the reduced resolution monochromatic image. In some implementations, the imaging device 200 discards information related exclusively to the color image and not the reduced resolution monochromatic image. In further implementations, the imaging device 200 stores the additional information for later or alternate use.

In some implementations, by reducing the resolution of the reduced resolution monochromatic image, the decode operation is improved. In particular, the decode operation may be able to decode lower resolution images, as fine detail may prove unnecessary for the operation and/or recognizing the barcode or decode indicia pattern. As such, the decode operation may have a better speed for lower resolution images without sacrificing accuracy or efficiency.

Embodiments of the present disclosure may have certain advantages over traditional approaches. For example, using a single assembly to provide both aiming light and a decode indication can reduce complexity, footprint, costs, etc. Similarly, providing a visible decode indication using the aiming light may improve a rate at which users recognize the indication, as auditory cues may be missed in a noisy or busy environment and an illumination system has a large FOV across which the system projects light, diffusing the light and reducing overall visibility.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device, comprising:

one or more processors;

an imaging assembly including a color imaging sensor configured to capture color image data of a field of view (FOV); and a non-transitory computer-readable medium storing machine readable instructions that, when executed, cause the one or more processors to:

capture, using the color imaging sensor, the color image data of the FOV, the color image data corresponding to one or more pixels;

generate, using one or more monochromatic superpixels corresponding to the color image data, a reduced resolution monochromatic image, wherein:

each monochromatic superpixel of the one or more monochromatic superpixels comprises a plurality of pixels of the one or more pixels, and the reduced resolution monochromatic image has a lower resolution than the color image data;

analyze the reduced resolution monochromatic image to detect a decode indicia in the reduced resolution monochromatic image; and decode the decode indicia in the reduced resolution monochromatic image.

2. The imaging device of claim 1, wherein the machine readable instructions that, when executed, cause the one or more processors to generate the reduced resolution monochromatic image include further instructions that, when executed, cause the one or more processors to:

receive one or more photo-electrons via each of the plurality of pixels of a corresponding monochromatic superpixel;

generate, using the one or more photo-electrons, a composite photo-electron count for each respective monochromatic superpixel; and generate the reduced resolution monochromatic image using each composite photo-electron count for the each respective monochromatic superpixel.

3. The imaging device of claim 2, wherein the machine readable instructions that, when executed, cause the one or more processors to generate the composite photo-electron count for each respective monochromatic superpixel include further instructions that, when executed, cause the one or more processors to:

average signals associated with the plurality of pixels corresponding to the each respective monochromatic superpixel to generate a composite photo-electron count representative of the averaged signals.

4. The imaging device of claim 2, wherein the machine readable instructions that, when executed, cause the one or more processors to generate the composite photo-electron count for each respective monochromatic superpixel include further instructions that, when executed, cause the one or more processors to:

add signals associated with the plurality of pixels corresponding to the each respective monochromatic superpixel to generate a composite photo-electron count representative of the added signals.

5. The imaging device of claim 2, wherein the machine readable instructions that, when executed, cause the one or more processors to receive the one or more photo-electrons include further instructions that, when executed, cause the one or more processors to:

receive a first subset of photo-electrons of a first range of photon wavelengths via a first pixel of the plurality of pixels of the corresponding monochromatic superpixel; and receive a second subset of photo-electrons of a second range of photon wavelengths via a second pixel of the plurality of pixels of the corresponding monochromatic superpixel, the second range of photon wavelengths different than the first range of photon wavelengths.

6. The imaging device of claim 5, wherein the machine readable instructions that, when executed, cause the one or more processors to receive the one or more photo-electrons include further instructions that, when executed, cause the one or more processors to:

receive a third subset of photo-electrons of a third range of photon wavelengths via a third pixel of the plurality of pixels of the corresponding monochromatic superpixel, the third range of photon wavelengths different than the first range of photon wavelengths and the second range of photon wavelengths.

7. The imaging device of claim 6, wherein the machine readable instructions that, when executed, cause the one or more processors to receive the one or more photo-electrons include further instructions that, when executed, cause the one or more processors to:

receive a fourth subset of photo-electrons of the first range of photon wavelengths via a fourth pixel of the plurality of pixels of the corresponding monochromatic superpixel.

8. The imaging device of claim 6, wherein:

the first range of photon wavelengths is approximately 495 nanometers to 570 nanometers;

the second range of photon wavelengths is approximately 625 nanometers to 750 nanometers; and the third range of photon wavelengths is approximately 400 nanometers to 500 nanometers.

9. The imaging device of claim 1, wherein the machine readable instructions that, when executed, cause the one or more processors to generate the reduced resolution monochromatic image include further instructions that, when executed, cause the one or more processors to:

average signals associated with a subset of the monochromatic superpixels to generate a composite photo-electron count representative of the averaged signals.

10. The imaging device of claim 1, wherein the one or more monochromatic superpixels have a first size when the imaging device operates in a first operation mode and a second size when the imaging device operates in a second operation mode.

11. The imaging device of claim 10, wherein the first operation mode is a hand-held scanning mode and the second operation mode is a presentation mode.

12. The imaging device of claim 10, wherein the first size is a 2 pixel by 2 pixel size and the second size is a 4 pixel by 4 pixel size.

13. The imaging device of claim 1, wherein the non-transitory computer-readable medium stores further instructions that, when executed, cause the one or more processors to:

transmit, from a first module via a first virtual channel, the reduced resolution monochromatic image for detecting the decode indicia; and transmit, from the first module via a second virtual channel, the color image data.

14. A method, implemented in an imaging device including a color imaging sensor, the method comprising:

capturing, via one or more processors and using the color imaging sensor, color image data of a field of view (FOV), the color image data corresponding to one or more pixels;

generating, via the one or more processors and using one or more monochromatic superpixels corresponding to the color image data, a reduced resolution monochromatic image, wherein:

each monochromatic superpixel of the one or more monochromatic superpixels comprises a plurality of pixels of the one or more pixels, and the reduced resolution monochromatic image has a lower resolution than the color image data;

analyzing, via the one or more processors, the reduced resolution monochromatic image to detect a decode indicia in the reduced resolution monochromatic image; and decoding, via the one or more processors, the decode indicia in the reduced resolution monochromatic image.

15. The method of claim 14, wherein the generating the reduced resolution monochromatic image includes:

receiving, via the one or more processors, one or more photo-electrons via each of the plurality of pixels of a corresponding monochromatic superpixel;

generating, via the one or more processors and using the one or more photo-electrons, a composite photo-electron count for each respective monochromatic superpixel; and generating, via the one or more processors, the reduced resolution monochromatic image using each composite photo-electron count for the each respective monochromatic superpixel.

16. The method of claim 15, wherein the generating the composite photo-electron count for each respective monochromatic superpixel includes:

averaging, via the one or more processors, signals associated with the plurality of pixels corresponding to the each respective monochromatic superpixel to generate a composite photo-electron count representative of the averaged signals.

17. The method of claim 15, wherein the generating the composite photo-electron count for each respective monochromatic superpixel includes:

adding, via the one or more processors, signals associated with the plurality of pixels corresponding to the each respective monochromatic superpixel to generate a composite photo-electron count representative of the added signals.

18. The method of claim 15, wherein the receiving the one or more photo-electrons includes:

receiving, via the one or more processors, a first subset of photo-electrons of a first range of photon wavelengths via a first pixel of the plurality of pixels of the corresponding monochromatic superpixel; and receiving, via the one or more processors, a second subset of photo-electrons of a second range of photon wavelengths via a second pixel of the plurality of pixels of the corresponding monochromatic superpixel, the second range of photon wavelengths different than the first range of photon wavelengths.

19. The method of claim 18, wherein the receiving the one or more photo-electrons further includes:

receiving, via the one or more processors, a third subset of photo-electrons of a third range of photon wavelengths via a third pixel of the plurality of pixels of the corresponding monochromatic superpixel, the third range of photon wavelengths different than the first range of photon wavelengths and the second range of photon wavelengths.

20. The method of claim 19, wherein the receiving the one or more photo-electrons further includes:

receiving, via the one or more processors, a fourth subset of photo-electrons of the first range of photon wavelengths via a fourth pixel of the plurality of pixels of the corresponding monochromatic superpixel.

21. The method of claim 19, wherein:

the first range of photon wavelengths is approximately 495 nanometers to 570 nanometers;

the second range of photon wavelengths is approximately 625 nanometers to 750 nanometers; and the third range of photon wavelengths is approximately 400 nanometers to 500 nanometers.

22. The method of claim 14, wherein the generating of the reduced resolution monochromatic image includes:

averaging signals associated with a subset of the monochromatic superpixels to generate a composite photo-electron count representative of the averaged signals.

23. The method of claim 14, wherein the one or more monochromatic superpixels have a first size when the imaging device operates in a first operation mode and a second size when the imaging device operates in a second operation mode.

24. The method of claim 23, wherein the first operation mode is a hand-held scanning mode and the second operation mode is a presentation mode.

25. The method of claim 23, wherein the first size is a 2 pixel by 2 pixel size and the second size is a 4 pixel by 4 pixel size.

26. The method of claim 14, further comprising:

transmitting, by the one or more processors and from a first module via a first virtual channel, the reduced resolution monochromatic image for detecting the decode indicia; and transmit, by the one or more processors and from the first module via a second virtual channel, the color image data.

* * * * *